United States Patent
Choi et al.

(10) Patent No.: US 8,160,158 B2
(45) Date of Patent: Apr. 17, 2012

(54) SCALABLE VIDEO CODING METHOD AND APPARATUS AND SCALABLE VIDEO DECODING METHOD AND APPARATUS

(75) Inventors: Woong-il Choi, Hwaseong-si (KR); Dae-sung Cho, Seoul (KR); Dae-hee Kim, Suwon-si (KR); Hyun-mun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1070 days.

(21) Appl. No.: 12/076,126

(22) Filed: Mar. 13, 2008

(65) Prior Publication Data

US 2009/0097573 A1 Apr. 16, 2009

(30) Foreign Application Priority Data

Oct. 12, 2007 (KR) .......................... 10-2007-0103163

(51) Int. Cl.
*H04N 7/26* (2006.01)
(52) U.S. Cl. .................................. 375/240.26
(58) Field of Classification Search .................. 375/240, 375/240.01, 240.1, 240.11–240.18, 240.21; 382/232–235, 239, 302
See application file for complete search history.

(56) References Cited

U.S. PATENT DOCUMENTS

| | | | |
|---|---|---|---|
| 5,892,847 A * | 4/1999 | Johnson | 382/232 |
| 6,510,177 B1 * | 1/2003 | De Bonet et al. | 375/240.16 |
| 7,380,028 B2 * | 5/2008 | Crinon et al. | 710/52 |
| 7,817,865 B2 * | 10/2010 | Yang | 382/233 |
| 2005/0254575 A1 * | 11/2005 | Hannuksela et al. | 375/240.1 |
| 2005/0259729 A1 * | 11/2005 | Sun | 375/240.1 |
| 2006/0256851 A1 * | 11/2006 | Wang et al. | 375/240.01 |
| 2008/0175325 A1 * | 7/2008 | Hannuksela et al. | 375/240.26 |

* cited by examiner

*Primary Examiner* — Frank Duong
(74) *Attorney, Agent, or Firm* — Staas & Halsey LLP (57) ABSTRACT

Provided are a scalable video coding method and apparatus, and a scalable video decoding method and apparatus. The coding method generates a base layer bitstream of video by using one of a plurality of codecs, determines whether the used codec supports enhancement layer coding, decodes the base layer bitstream according to the result of the determination in order to extract coded information used for the generation of the base layer bitstream, and generates an enhancement layer bitstream of the original video based on the extracted information. Accordingly, it is possible to provide high-quality video and increase coding efficiency while using the various existing codecs.

15 Claims, 8 Drawing Sheets

| SYMBOLS | SUPPORTING CODECS |
|---|---|
| 1 | H.264 BASELINE |
| 2 | H.264 MAIN |
| 3 | VC-1 SIMPLE |
| 4 | VC-1 ADVANCED |
| ... | ... |
| N | H.263 BASELINE |
| N+1 | UNKNOWN CODEC |

ENHANCEMENT LAYER   BASE LAYER

FIG. 5A

BASE LAYER   ENHANCEMENT LAYER

FIG. 5B

BASE LAYER → ENHANCEMENT LAYER

FIG. 5C

BASE LAYER → ENHANCEMENT LAYER

SCALABLE VIDEO CODING METHOD AND APPARATUS AND SCALABLE VIDEO DECODING METHOD AND APPARATUS

CROSS-REFERENCE TO RELATED APPLICATIONS

This application claims the benefit of Korean Patent Application No. 10-2007-0103163, filed on Oct. 12, 2007, in the Korean Intellectual Property Office, the disclosure of which is incorporated herein in its entirety by reference.

BACKGROUND

1. Field

One or more embodiments of the present invention relates to a scalable video coding method and apparatus, and a scalable video decoding method and apparatus.

2. Description of the Related Art

Scalable video coding (SVC) is a technique of coding video into a bitstream having a plurality of layers. If a bitstream is scalable video coded, a decoding unit can decode the bitstream by using layers selected from among a plurality of layers of the coded bitstream. Such a bitstream includes a base layer and one or more enhancement layers. The base layer bitstream is a fundamental bitstream, and the original video can be reconstructed using the base layer bitstream. However, this results in the quality of the reconstructed video being low. If the base layer bitstream and an enhancement layer bitstream are used together, the quality of the reconstructed video is improved. In this case, only the base layer bitstream or both the base layer bitstream and the enhancement layer bitstream are decoded depending on an available transmission bandwidth.

SVC has been actively used in various video compression techniques, such as MPEG-2, MPEG-4, H.263, and H.264, and is expected to be applied to various video codecs henceforth.

SUMMARY

One or more embodiments of the present invention provides a scalable video coding method and apparatus capable of performing coding by applying the common characteristics of a plurality of codecs to inter-layer prediction while using one of a plurality of codecs as a base layer codec.

One or more embodiments of the present invention also provides a scalable video decoding method and apparatus capable of performing decoding by applying the common characteristics of the codecs to inter-layer prediction while using one of a plurality of codecs as a base layer codec.

One or more embodiments of the present invention also provides a computer readable recording medium having recorded thereon a computer program for executing the above methods.

Additional aspects and/or advantages will be set forth in part in the description which follows and, in part, will be apparent from the description, or may be learned by practice of the invention.

According to an aspect of the present invention, there is provided a scalable video coding method comprising generating a base layer bitstream of video by using one of a plurality of codecs; identifying which codec is used for generating the base layer bitstream; decoding the base layer bitstream according to the result of the determining in order to extract coding information used to generate the base layer bitstream; and generating an enhancement layer bitstream of the original video based on the extracted coding information.

According to another aspect of the present invention, there is provided a scalable video coding apparatus comprising a base layer coding unit generating a base layer bitstream of video by using one of a plurality of codecs; a codec determination unit identifying which codec is used for base layer encoding; a symbol extraction unit decoding the base layer bitstream according to the result of the determining in order to extract coding information used for the generating of the base layer bitstream; and an enhancement layer coding unit generating an enhancement layer bitstream of the original video based on the extracted coding information.

According to another aspect of the present invention, there is provided a scalable video decoding method comprising dividing a received bitstream into a base layer bitstream and an enhancement layer bitstream; identifying which codec is used for decoding the base layer bitstream; decoding the base layer bitstream according to the result of the determining in order to extract information for coding the base layer bitstream; and decoding the enhancement layer bitstream based on the extracted information.

According to another aspect of the present invention, there is provided a computer readable medium having recorded thereon a computer program for executing the scalable video decoding method.

According to another aspect of the present invention, there is provided a scalable video decoding apparatus comprising a bitstream separation unit dividing a received bitstream into a base layer bitstream and an enhancement layer bitstream; a codec determination unit identifying which codec is used for base layer decoding; an information extraction unit decoding the base layer bitstream according to the result of the determining in order to extract information for coding the base layer bitstream; and an enhancement layer decoding unit decoding the enhancement layer bitstream based on the extracted information.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
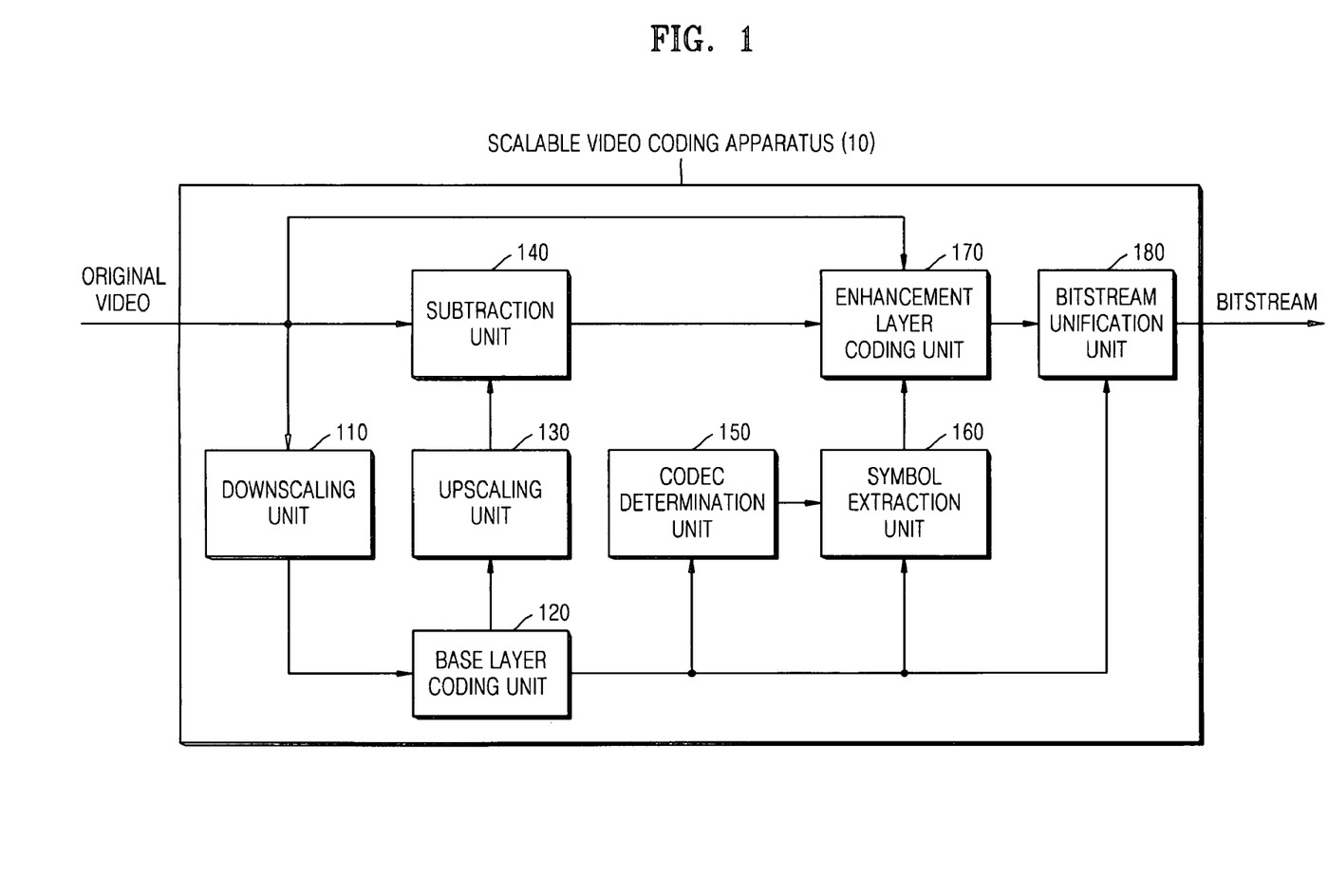
FIG. 1 is a block diagram of a scalable video coding apparatus according to an embodiment of the present invention.

FIG. 1 is a block diagram of a scalable video coding apparatus 10 according to an embodiment of the present invention. As illustrated in FIG. 1, the coding apparatus 10 includes a downscaling unit 110, a base layer coding unit 120, an upscaling unit 130, a subtraction unit 140, a codec determination unit 150, a symbol extraction unit 160, an enhancement layer coding unit 170, and a bitstream unification unit 180.

The downscaling unit 110 downscales the received original video in order to control the quality of the video. In particular, the downscaling unit 110 performs various downscaling techniques depending on a scalability scheme that the coding apparatus 10 uses in order to code the original video.

For example, the downscaling unit 110 can reduce the resolution of the original video by subsampling the frames of the original video in the horizontal and vertical directions. As another example, the downscaling unit 110 can reduce the frame rate of the original video by removing some of the frames constituting the original video. As another example, the downscaling unit 110 can perform video format transformation. If the original video has a video format of 4:4:4, down sampling may be performed on a chrominance block in order to convert the original video into a 4:2:2 or 4:2:0 format. The 4:4:4 format means that all three components, i.e., a luminance component Y and chrominance components Cb and Cr, are present in all the pixels of the original video. The 4:2:2 format means that the resolutions of the chrominance components Cb and Cr are equal to the resolution of the luminance component Y in the horizontal direction but are half the resolution of the luminance component Y in the vertical direction. The 4:2:0 format means that the resolutions of the chrominance components Cb and Cr are half the resolution of the luminance component Y in both the horizontal and vertical directions. As another example, the downscaling unit 110 can reduce the bit depths of the pixels of the original video from 8 bits to 6 bits. The downscaling process of the downscaling unit 110 can be embodied in various ways depending on the type of scalable video coding technique, and the downscaling unit 110 according to the present embodiment is not limited to the above description. The downscaling unit 110 can be omitted in some cases.

The base layer coding unit 120 generates a base layer bitstream by coding the video downscaled by the downscaling unit 110 by using motion compensation, orthogonal transformation, quantization, and entropy coding, and generates a reconstructed base layer video by decoding the base layer bitstream. In particular, in order to perform coding for the generation of the base layer bitstream, the base layer coding unit 120 may use one of the legacy video codec which are compatible with conventional video compression standards, such as H.264 baseline profile, H.264 main profile, VC-1 simple profile, VC-1 advanced profile, MPEG-4 part2 simple profile, MPEG-4 part2 advanced simple profile, MPEG-4 part2 main profile, and H.263 baseline profile.

The upscaling unit 130 generates an upscaled reconstructed video by upscaling the reconstructed base layer video generated by the base layer coding unit 120, where upscaling is the inverse of the downscaling process of the downscaling unit 110. That is, if the downscaling unit 110 reduces the resolution of the original video, the upscaling unit 130 increases the resolution of the reconstructed video again by interpolating the reconstructed video. If the downscaling unit 110 reduces the frame rate of the original video, the upscaling unit 130 increases the frame rate of the reconstructed video by generating new frames by using the frames of the reconstructed video and inserting the new frames into the frames of the reconstructed video. If the downscaling unit 110 changes the format of the original video, the upscaling unit 130 converts the format of the reconstructed video to be identical to the format of the original video. If the downscaling unit 110 reduces the bit depths of the pixels of the original video, the upscaling unit 130 restores them to the original bit depths. The upscaling process of the upscaling unit 130 can be embodied in various ways depending on the type of scalable video coding technique, and the upscaling unit 130 according to the present embodiment is not limited to the above description. The upscaling unit 130 can also be omitted in some cases.

The subtraction unit 140 obtains residual video between the original video and the upscaled reconstructed video that was generated by the upscaling unit 130.

Figure 2:
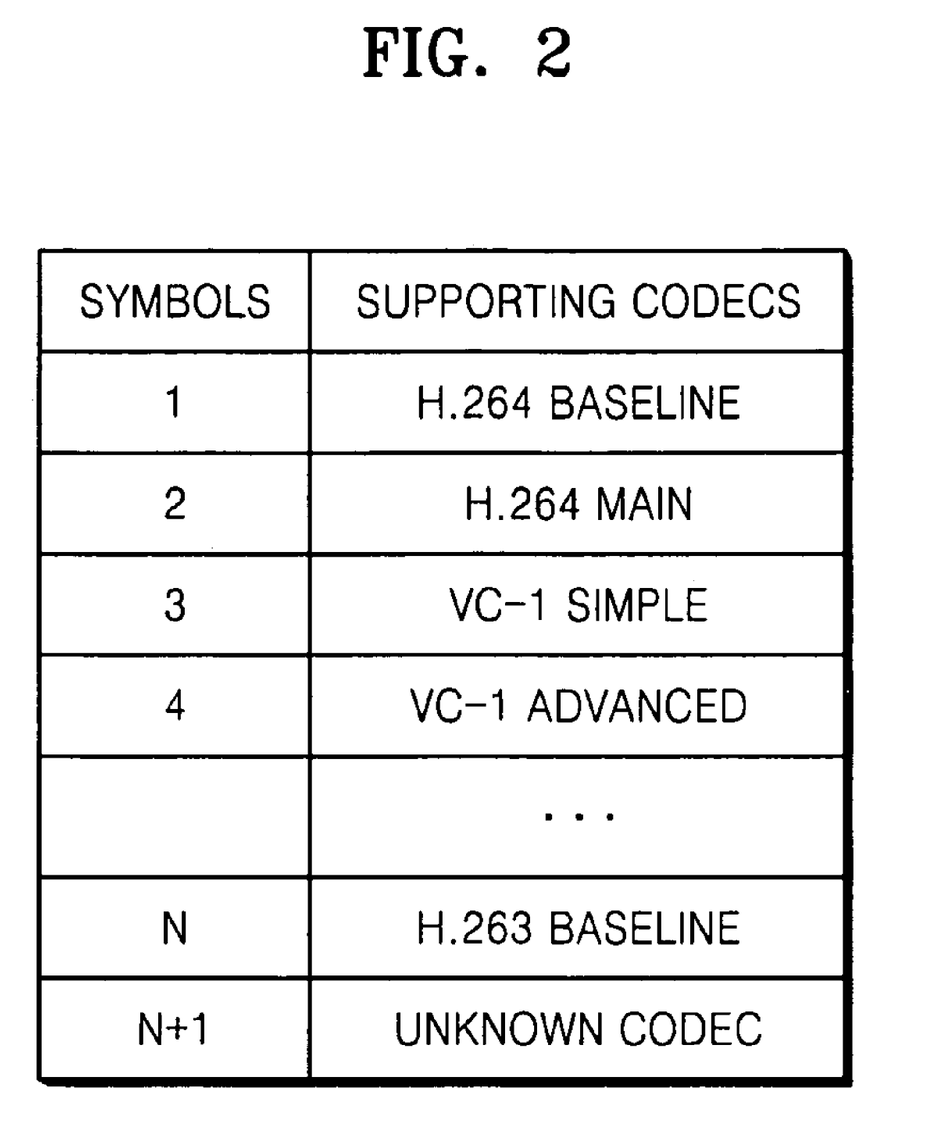
FIG. 2 is a table illustrating various codecs that can be used by a base layer coding unit included in the coding apparatus of FIG. 1, and codec identifiers thereof.

The codec determination unit 150 determines a codec used by the base layer coding unit 120, and records a codec identifier (ID) of the codec in the header of an enhancement layer bitstream in order to identify the codec used for base layer coding. FIG. 2 is a table illustrating various types of codecs that can be used by the base layer coding unit 120, and codec IDs thereof. Here, codec ID 1 denotes the H.264 baseline profile codec, codec ID 2 denotes the H.264 main profile codec, codec ID 3 denotes the VC-1 simple profile codec, codec ID 4 denotes the VC-1 advanced profile codec, and codec ID N denotes the H.263 baseline profile codec. Here, codec IDs 1 to N denote codecs that can be identified, and a codec that is not supported is recorded as 'N+1'. While recording the codec ID, it is determined whether the codec used for base layer coding is supportable, that is, whether the codec can perform symbol extraction.

If the codec determination unit 150 determines that the codec that has been used for base layer coding can also support enhancement layer coding, the symbol extraction unit 160 extracts symbols used for coding the base layer bitstream by entropy decoding the base layer bitstream generated by the base layer coding unit 120, and then modifies the extracted symbols so that they can be used by the enhancement layer coding unit 170. Symbol modification is performed when symbols extracted from a base layer bitstream cannot be directly applied to an enhancement layer since the characteristics of the symbols may be different from one another depending on the type of codec used at a base layer or since the base layer may be different from the enhancement layer in terms of an coding environment, such as frame size or the total number of motion vectors in a macroblock, in the case of scalable coding even if the characteristics of the symbols are the same. Symbols that can be extracted from the base layer bitstream are syntax information that is commonly included in all the existing video standards. For example, the symbols may be macroblock type information, motion vectors, a coded block pattern (CBP), quantized transform coefficients, and residues that are obtained by inversely quantizing a transform coefficient value. The macroblock type information represents a coding mode of a current macroblock, that is, information indicating whether the current macroblock is an inter macroblock to which motion prediction and compensation are applied or an intra macroblock to which spatial prediction is applied. In some cases, in the case of an inter macroblock, the macroblock type information represents information regarding motion compensation, e.g., information indicating whether the size of the current macroblock is 16×16, 16×8, 8×16, or 8×8, or the direction or type of a motion vector, e.g., a forward direction, a reverse direction, a bi-direction, or a direct mode. The motion vector represents the displacement between the current macroblock and a corresponding reference macroblock, which is determined for inter-frame prediction. The CBP indicates the location of a block having non-zero quantized transform coefficients within a macroblock, that is, it indicates whether at least one quantized transform coefficient is present in a block constituting the macroblock.

Figure 3:
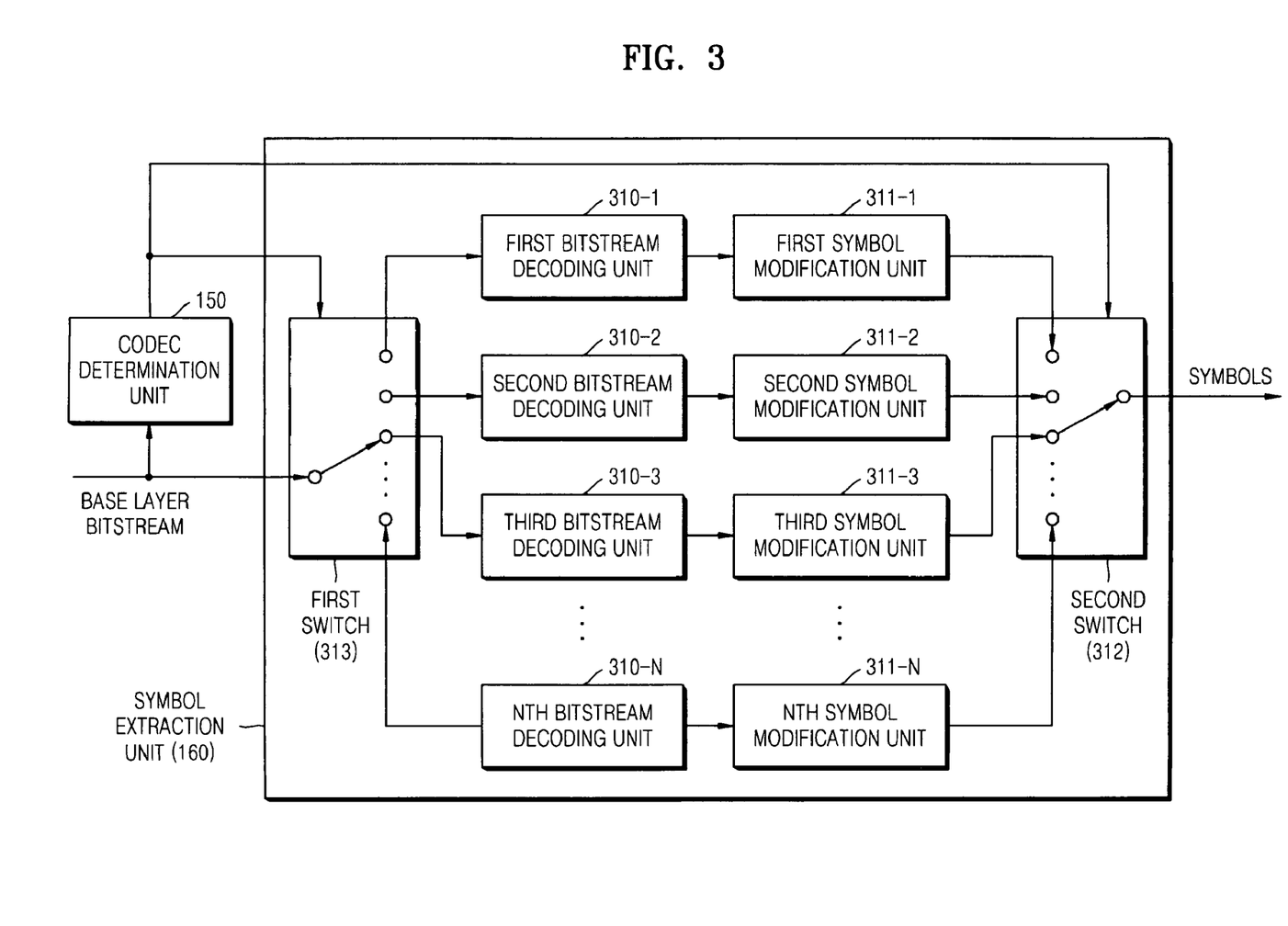
FIG. 3 is a block diagram illustrating in detail a symbol extraction unit included in the coding apparatus of FIG. 1 according to an embodiment of the present invention.

As illustrated in FIG. 3, the symbol extraction unit 160 includes a first switch 312, a second switch 313, a first bitstream decoding unit 310-1 that decodes a base layer bitstream by using the H.264 baseline profile codec, a first symbol modification unit 311-1, a second bitstream decoding unit 310-2 that decodes a base layer bitstream by using the H.264 main profile codec, a second symbol modification unit 311-2, a third bitstream decoding unit 310-3 that decodes a base layer bitstream by using the VC-1 simple profile codec, a third symbol modification unit 311-3, through to an $N^{th}$ bitstream decoding unit 310-N that decodes a base layer bitstream by using the H.263 baseline profile codec, and an $N^{th}$ symbol modification unit 311-N.

The symbol extraction unit 160 will be described in greater detail with respect to a case where the VC-simple profile codec has been used for base layer coding. However, the following description regarding the symbol extraction unit 160 can be applied to a case where a codec used for base layer coding is the H.264 baseline profile codec, the H.264 main profile codec, or the VC-1 advanced profile codec.

If the VC-1 simple profile codec is used for base layer coding, the first switch 312 connects the base layer coding unit 120 to the third bitstream decoding unit 310-3, and the second switch 313 connects the third symbol modification unit 311-3 to the enhancement layer coding unit 170. Then the third bitstream decoding unit 310-3 performs entropy decoding on the base layer bitstream in order to extract symbols, e.g., macroblock type information, motion vectors, a CBP, or quantized transform coefficients, from the base layer bitstream. The third symbol modification unit 311-3 modifies the extracted symbols so that they can be used by the enhancement layer coding unit 170.

Figure 4:
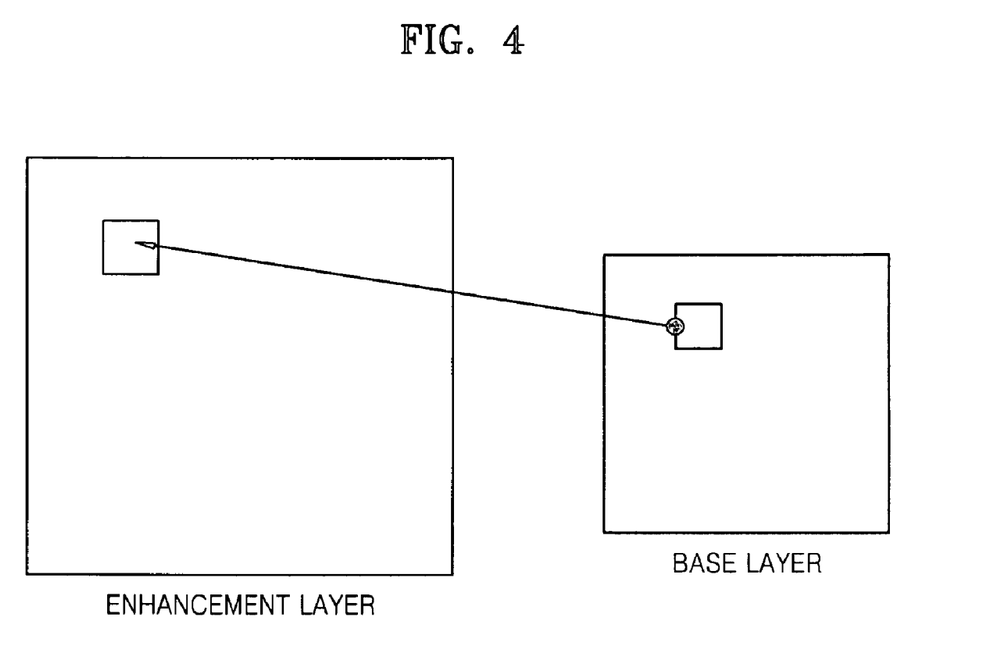
FIG. 4 is a diagram illustrating symbol extraction performed by a third symbol modification unit illustrated in FIG. 3 in consideration of the sizes of a base layer frame and an enhancement layer frame, according to an embodiment of the present invention.

For example, as illustrated in FIG. 4, if the frame size of the base layer is different from the frame size of the enhancement layer, the third symbol modification unit 311-3 modifies the extracted symbols by mapping them so that they are suitable for an enhancement layer macroblock in consideration of the sizes of the frames.

If the extracted symbols are motion vectors, a method of modifying the motion vector will be described in greater detail later with reference to FIGS. 5A through 5C.

If the total number of motion vectors present in a macroblock of the enhancement layer is equal to that of motion vectors in a macroblock of the base layer, the third symbol modification unit 311-3 does not modify the motion vectors of the base layer, which are extracted by the third bitstream decoding unit 310-3.

Figure 5A:
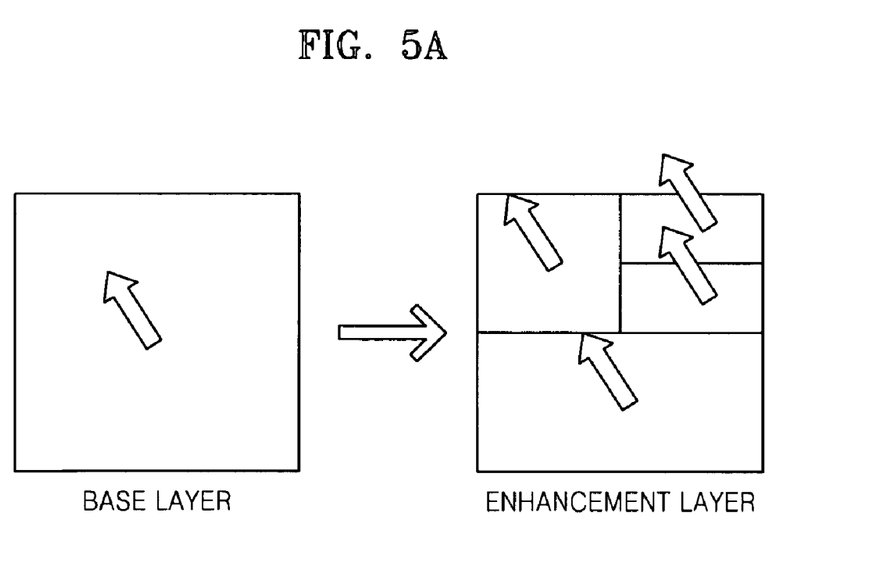
FIGS. 5A through 5C are diagrams illustrating modification of extracted motion vectors by using the third symbol modification unit, according to embodiments of the present invention.
Figure 5B:
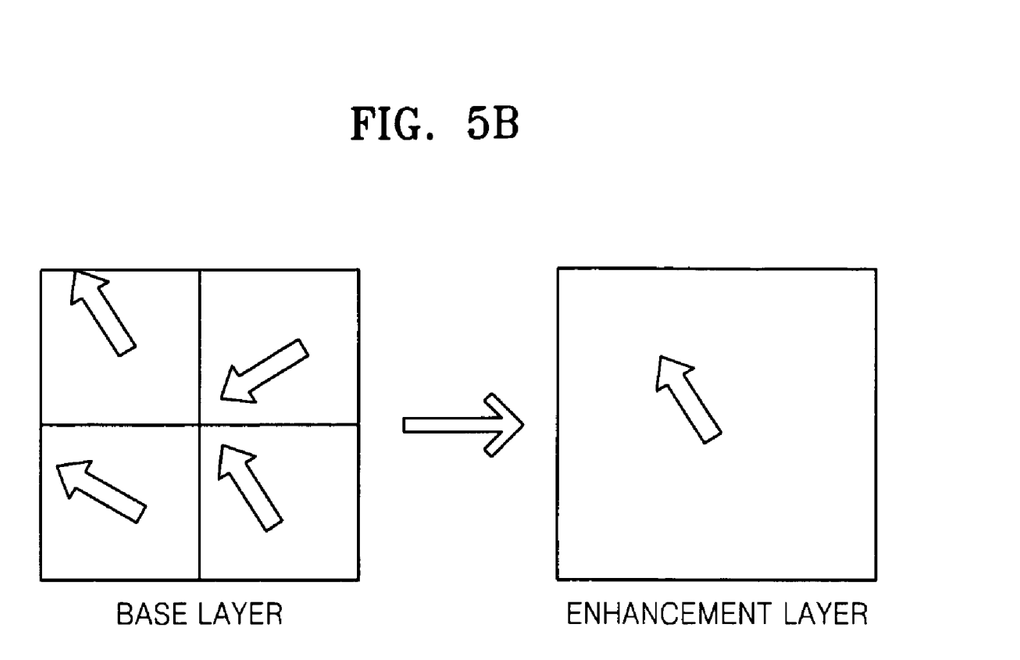
Figure 5C:
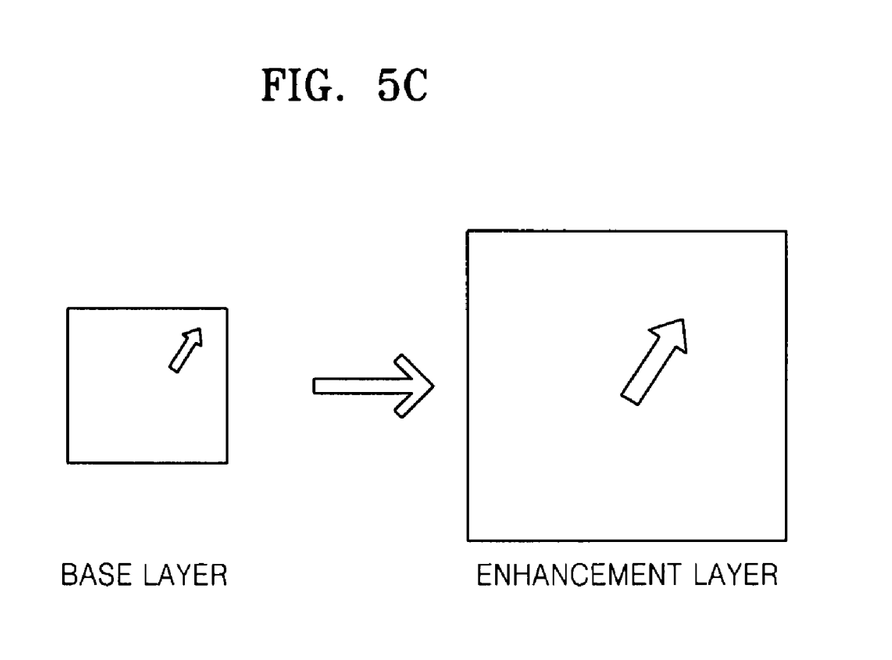

However, if the total number of the motion vectors present in the macroblock of the enhancement layer is different from that of the motion vectors in the macroblock of the base layer as illustrated in FIGS. 5A and 5B, the third symbol modification unit 311-3 modifies the extracted motion vectors of the base layer so that they are suitable for the macroblock of the enhancement layer.

Specifically, if the total number of the motion vectors in the macroblock of the enhancement layer is different from the total number of motion vectors in the corresponding macroblock of the extracted base layer, the motion vectors in the macroblock of the extracted base layer are modified to new motion vectors where the total number of the motion vectors is equal to the enhancement layer. For example, if the total number of the motion vectors in the macroblock of the enhancement layer is greater than the total number of the motion vectors in the macroblock of the base layer, the motion vectors of the macroblock of the extracted base layer can be reproduced to multiple vectors and used as motion vectors or motion vector predictor of the corresponding macroblock of the enhancement layer, as illustrated in FIG. 5A. However, if the total number of the motion vectors in the macroblock of the enhancement layer is less than the total number of the motion vectors in the macroblock of the base layer, the motion vectors in the macroblock of the extracted base layer is merged to one motion vector and the merged vector is used as a motion vector or motion vector predictor of the macroblock of the enhancement layer, as illustrated in FIG. 5B.

If the size of a frame of the enhancement layer is different from the size of a corresponding frame of the base layer, the size of a motion vector of a macroblock of the enhancement layer is controlled in consideration of the difference between these frames. For example, as illustrated in FIG. 5C, if the size of a frame of the enhancement layer is twice the size of a frame of the base layer, the size of the motion vector of a macroblock of the enhancement layer can be calculated by multiplying the size of a motion vector extracted from the base layer by 2.

The enhancement layer coding unit 170 codes either the original video or the residual video between the original video and the upscaled reconstructed video, which is obtained by the subtraction unit 140, based on the symbols extracted by the symbol extraction unit 160, that is, the information used for base layer coding by the base layer coding unit 120. According to the present embodiment, the information used for base layer coding may be macroblock type information, a CBP, motion vectors, and quantized transform coefficients but it will be apparent to those of ordinary skilled in the technical field to which the present invention pertains that the information is not limited thereto.

More specifically, the enhancement layer coding unit 170 codes the original video or the residual video received from the subtraction unit 140 by using motion compensation, transformation, and quantization in order to generate a bitstream containing motion vectors and quantized transform coefficients. The enhancement layer coding unit 170 determines whether the generated motion vectors and quantized transform coefficients respectively correspond to the motion vectors and quantized transform coefficients extracted by the symbol extraction unit 160, based on the macroblock type information and the CBP that are extracted by the symbol extraction unit 160. If it is determined that they correspond to one another, the enhancement layer coding unit 170 uses the extracted motion vectors and quantized transform coefficients as predicted values during prediction coding. That is, an enhancement layer bitstream is generated by entropy coding the differences between the motion vectors and the differences between the quantized transform coefficients.

In this case, if the motion vectors and the quantized transform coefficients extracted by the symbol extraction unit 160 are similar to the motion vectors and the quantized transform coefficients generated by the enhancement layer coding unit 170, the efficiency of coding can be improved.

The bitstream unification unit 180 generates a unified bitstream by unifying the base layer bitstream generated by the base layer coding unit 120 with the enhancement layer bitstream generated by the enhancement layer coding unit 170.

As described above, a scalable video coding apparatus according to the present embodiment extracts information needed for enhancement layer coding by decoding a base layer bitstream, and performs enhancement layer coding on either the original video or residual video between the original video and reconstructed video based on the extracted information, thereby providing high-quality video and increasing high coding efficiency while using the existing various codecs.

Figure 6:
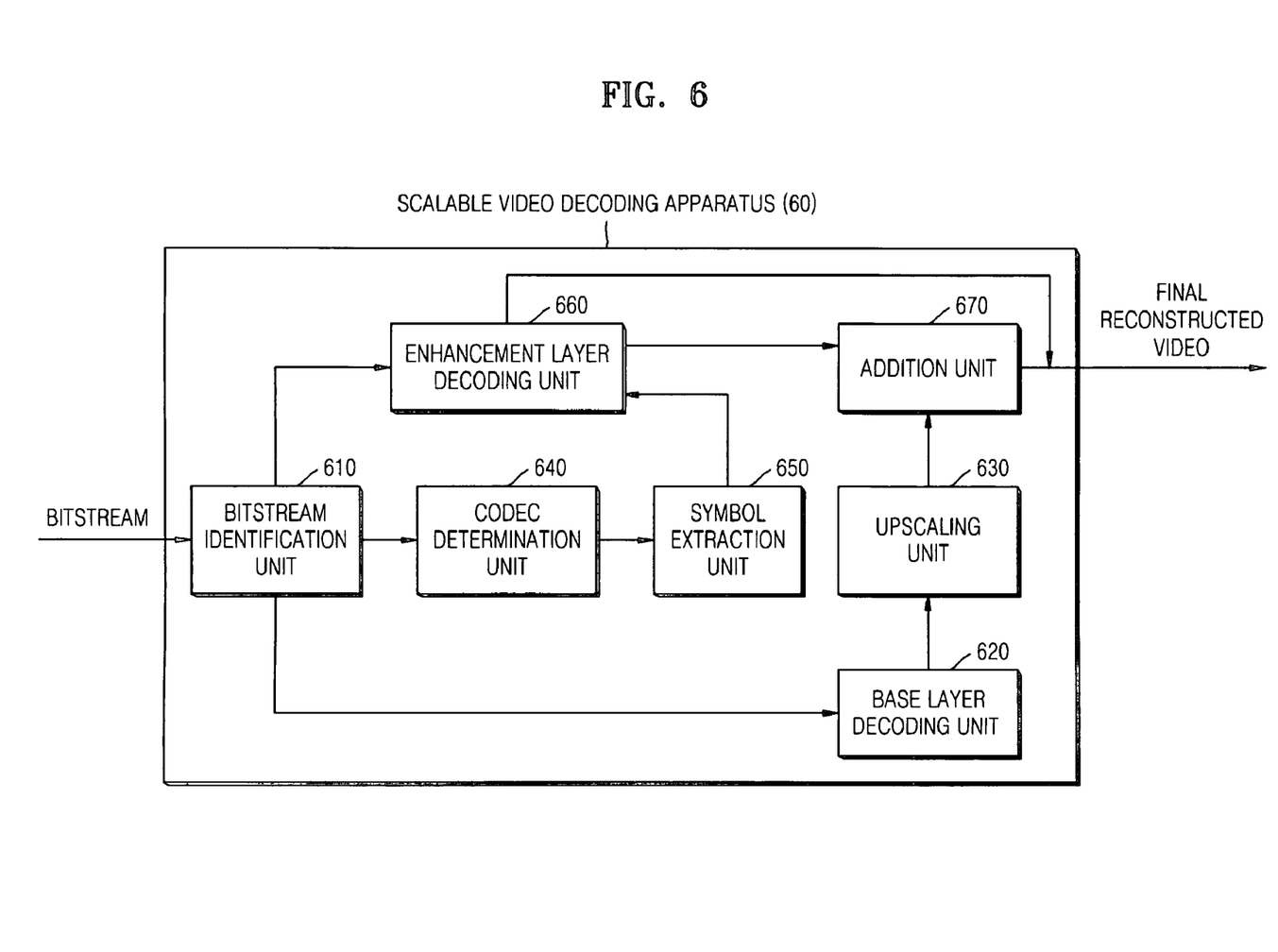
FIG. 6 is a block diagram of a scalable video decoding apparatus according to an embodiment of the present invention.

FIG. 6 is a block diagram of a scalable video decoding apparatus 60 according to an embodiment of the present invention. Referring to FIG. 6, the decoding apparatus 60 includes a bitstream identification unit 610, a base layer decoding unit 620, an upscaling unit 630, a codec determination unit 640, a symbol extraction unit 650, an enhancement layer decoding unit 660, and an addition unit 670.

The bitstream identification unit 610 identifies whether a received bitstream contains an enhancement layer bitstream, and divides the bitstream into a base layer bitstream and the enhancement layer bitstream when the enhancement layer bitstream is contained.

The base layer decoding unit 620 generates reconstructed base layer video by decoding the base layer bitstream, and the upscaling unit 630 generates an upscaled reconstructed video by upscaling the reconstructed base layer video. In particular, the base layer decoding unit 620 can use one of the legacy video codec which are compatible with conventional video compression standards, such as H.264 baseline profile, H.264 main profile, VC-1 simple profile, VC-1 advanced profile, MPEG-4 part2 simple profile, MPEG-4 part2 advanced simple profile, MPEG-4 part2 main profile, and H.263 baseline profile.

The codec determination unit 640 parses the header of the enhancement layer bitstream in order to extract a codec identifier identifying a codec used for base layer coding, and determines whether the codec identified by the extracted codec identifier supports enhancement layer decoding.

If the codec determination unit 640 determines that the codec used for base layer coding can be used for coding the enhancement layer, the symbol extraction unit 650 entropy decodes the base layer bitstream in order to extract symbols that were used for coding the base layer bitstream, and then modifies the extracted symbols so that they can be used by the enhancement layer decoding unit 660. The extracted symbols may be macroblock type information, motion vectors, a CBP, and quantized transform coefficients. As illustrated in FIG. 3, the symbol extraction unit 650 includes a first switch 312, a second switch 313, a first bitstream decoding unit 310-1 that extracts symbols from the base layer bitstream by using the H.264 baseline profile codec, and a first symbol modification unit 311-1, a second bitstream decoding unit 310-2 that extracts symbols from the base layer bitstream by using the H.264 main profile codec, a second symbol modification unit 311-2, a third bitstream decoding unit 310-3 that extracts symbols from the base layer bitstream by using the VC-1 simple profile codec, a third symbol modification unit 311-3, through to an $N^{th}$ bitstream decoding unit 310-N that extracts symbols from the base layer bitstream by using the H.263 baseline profile codec, and an $N^{th}$ symbol modification unit 311-N. The constituent elements and the operation of the symbol extraction unit 650 are the same as those of the symbol extraction unit 160 of the scalable video coding apparatus 10 illustrated in FIG. 1.

The enhancement layer decoding unit 660 decodes the enhancement layer bitstream in order to reconstruct residual video by using the symbols, such as macroblock type information, motion vectors, a CBP, and quantized transform coefficients, which were extracted and modified by the symbol extraction unit 650.

The addition unit 670 generates final reconstructed video by combining the reconstructed residual video with the upscaled reconstructed video received from the upscaling unit 630.

Figure 7:
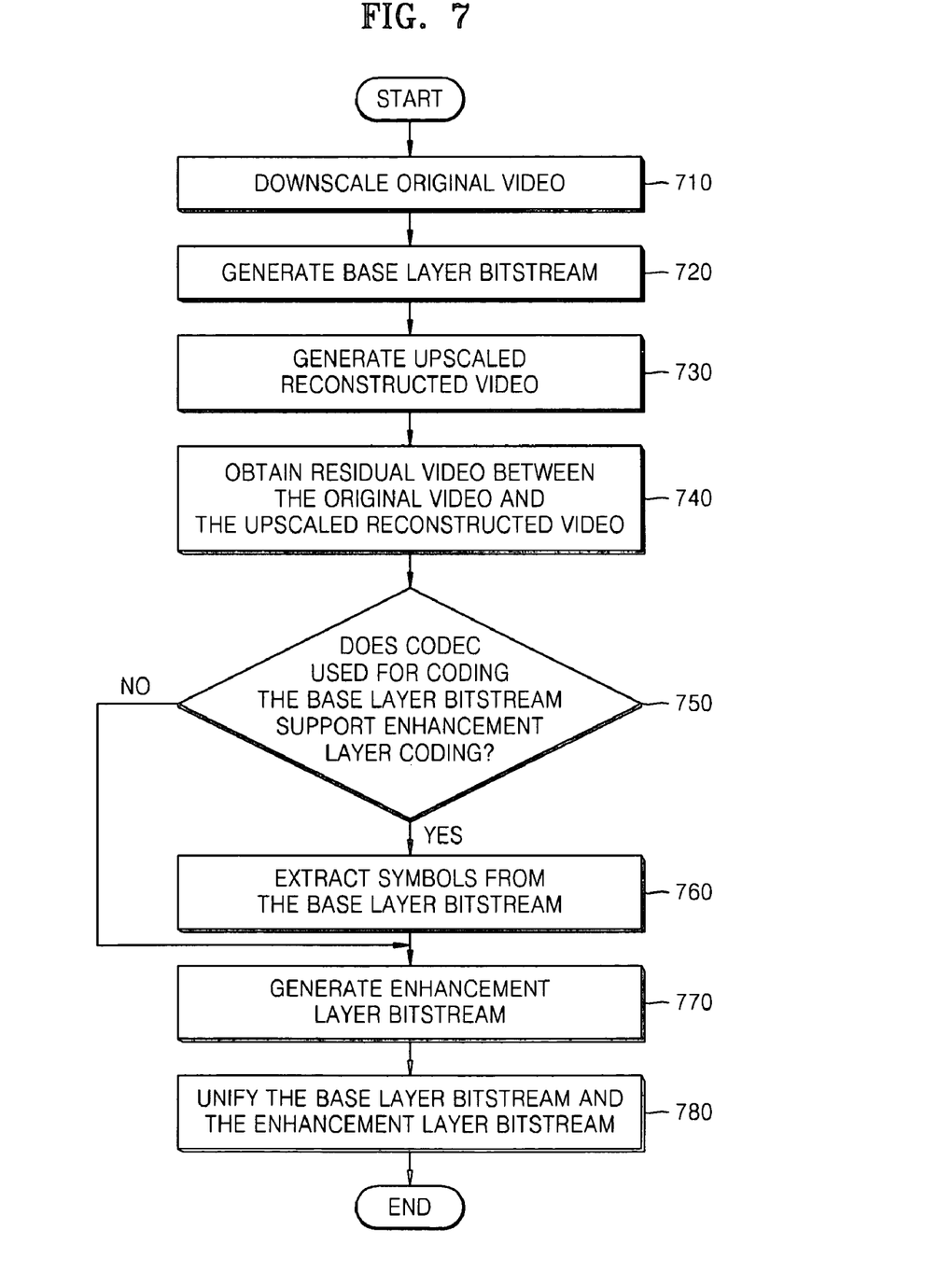
FIG. 7 is a flowchart illustrating a scalable video coding method according to an embodiment of the present invention.

FIG. 7 is a flowchart illustrating a scalable video coding method according to an embodiment of the present invention. Referring to FIG. 7, the coding method includes operations that are sequentially performed by the scalable video coding apparatus 10 illustrated in FIG. 1. Thus although not described here, the description of the scalable video coding apparatus 10 can be applied to the coding method illustrated in FIG. 7.

In operation 710, the scalable video coding apparatus 10 performs downscaling on received original video in order to control the quality of the video. Various downscaling techniques, such as a method of reducing the video resolution, a method of reducing the frame rate of the original video, a method of converting the video format, and a method of reducing a bit depth, can be performed depending on a scalability scheme that is to be used to code the original video by the scalable video coding apparatus 10.

In operation 720, the scalable video coding apparatus 10 generates a base layer bitstream by coding the downscaled video obtained in operation 710, and generates reconstructed base layer video by decoding the base layer bitstream. In this case, one of the legacy video codec which are compatible with conventional video compression standards, such as H.264 baseline profile, H.264 main profile, VC-1 simple profile, VC-1 advanced profile, MPEG-4 part2 simple profile, MPEG-4 part2 advanced simple profile, MPEG-4 part2 main profile, and H.263 baseline profile, can be used in order to perform coding for generation of the base layer bitstream.

In operation 730, the scalable video coding apparatus 10 generates upscaled reconstructed video by upscaling the reconstructed base layer video generated in operation 720. Here, the upscaling is the inverse of the downscaling performed in operation 710.

In operation 740, the scalable video coding apparatus 10 obtains residual video between the original video and the upscaled reconstructed video obtained in operation 730.

In operation 750, the scalable video coding apparatus 10 determines whether a base layer coding codec used in operation 720 can support enhancement layer coding, and records a codec identifier identifying the codec used for coding the base layer in the header of an enhancement layer bitstream.

In operation 760, if it is determined in operation 750 that the base layer coding codec used in operation 720 can support enhancement layer coding, the scalable video coding apparatus 10 entropy decodes the base layer bitstream generated in operation 720 in order to extract symbols used to code the base layer bitstream, and then modifies the extracted symbols so that they can be used in coding the enhancement layer, in operation 760. The symbols may be macroblock type information, motion vectors, a CBP, and quantized transform coefficients.

In operation 770, the scalable video coding apparatus 10 codes the residual video obtained in operation 740 in order to generate an enhancement layer bitstream by using the symbols that were extracted and modified in operation 760.

In operation 780, the scalable video coding apparatus 10 generates a unified bitstream by unifying the base layer bitstream generated in operation 720 with the enhancement layer bitstream generated in operation 770.

Figure 8:
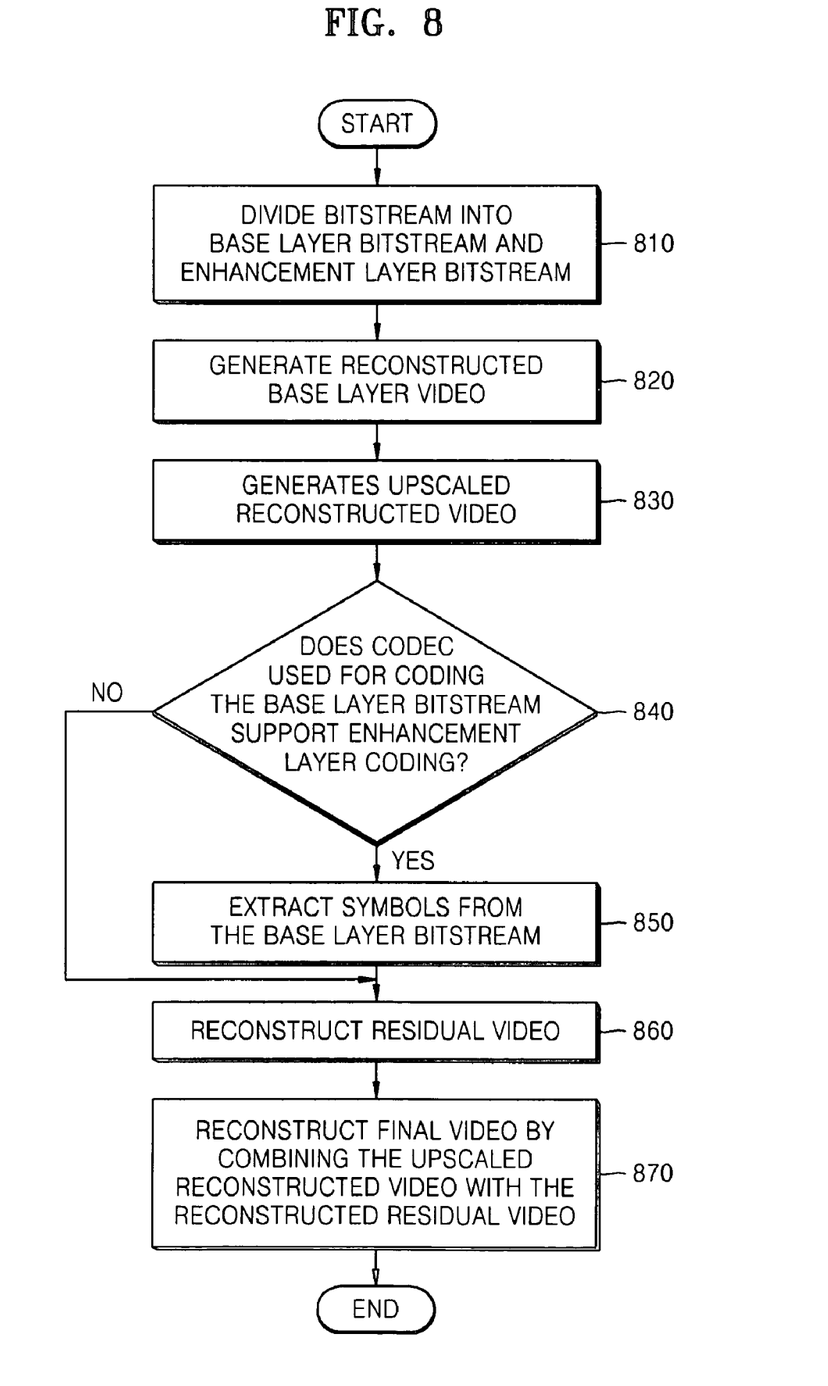
FIG. 8 is a flowchart illustrating a scalable video decoding method according to an embodiment of the present invention.

FIG. 8 is a flowchart illustrating a scalable video decoding method according to an embodiment of the present invention. Referring to FIG. 8, the decoding method includes operations that are sequentially performed by the scalable video decoding apparatus 60 illustrated in FIG. 6. Thus although not described here, the description of the scalable video coding apparatus 60 can be applied to the coding method illustrated in FIG. 8.

In operation 810, the scalable video coding apparatus 60 divides a received bitstream into a base layer bitstream and an enhancement layer bitstream.

In operation 820, the scalable video coding apparatus 60 generates reconstructed base layer video by decoding the base layer bitstream.

In operation 830, the scalable video coding apparatus 60 generates upscaled reconstructed video by upscaling the reconstructed base layer video.

In operation 840, the scalable video coding apparatus 60 parses the header of the enhancement layer bitstream obtained in operation 810 in order to extract a codec identifier identifying a codec used for base layer coding, and determines whether the identified codec supports enhancement layer decoding.

In operation 850, if it is determined in operation 840 that the identified codec supports enhancement layer decoding, the scalable video coding apparatus 60 entropy decodes the base layer bitstream in order to extract symbols used for coding the base layer bitstream, and modifies the extracted symbols so that they can be used for decoding the enhancement layer.

In operation 860, if it is determined in operation 840 that the identified codec supports enhancement layer decoding, the scalable video coding apparatus 60 uses the modified symbols during decoding the enhancement layer bitstream. However, if it is determined in operation 840 that the identified codec does not support enhancement layer decoding, the scalable video coding apparatus 60 reconstructs residual video by decoding the enhancement layer bitstream obtained in operation 810 without extracting symbols.

In operation 870, the scalable video coding apparatus 60 generates final reconstructed video by combining the reconstructed residual video with the upscaled reconstructed video.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A scalable video coding method comprising:
   generating a basic layer bitstream of video by using one of a plurality of codecs;
   identifying which codec is used for generating the base layer bitstream;
   decoding the base layer bitstream according to the result of the identifying in order to extract coding information used to generate the base layer bitstream; and
   generating an enhancement layer bitstream of the original video based on the extracted coding information.

2. The method of claim 1, wherein the coding information comprises at least one of macroblock type information, a coded block pattern (CBP), motion vectors, and quantized transform coefficients.

3. The method of claim 1, wherein the identifying of which codec is used for generating the base layer comprises:
   identifying the type of the codec used for coding by parsing the base layer bitstream; and
   determining whether the type of the used codec supports enhancement layer coding.

4. The method of claim 1, wherein the generating of the enhancement layer bitstream comprises generating an enhancement layer bitstream by coding residual video between the original video and the reconstructed video based on the extracted coding information.

5. The method of claim 1, further comprising:
   downscaling the received original video; and
   generating the base layer bitstream by coding the downscaled video.

6. A scalable video decoding method comprising:
   dividing a received bitstream into a base layer bitstream and an enhancement layer bitstream;
   identifying which codec is used for coding the base layer bitstream;
   decoding the base layer bitstream according to the result of the identifying in order to extract information for coding the base layer bitstream; and
   decoding the enhancement layer bitstream based on the extracted information.

7. The method of claim 6, wherein the extracted information comprises at least one of block type information, motion vectors, a coded block pattern (CBP), and quantized transform coefficients.

8. A scalable video coding apparatus comprising:
- a base layer coding unit to generate a base layer bitstream of video by using one of a plurality of codecs;
- a codec determination unit to identify which codec is used in the base layer;
- a symbol extraction unit to decode the base layer bitstream according to the result of the identifying in order to extract coding information used for the generating of the base layer bitstream; and
- an enhancement layer coding unit to generate an enhancement layer bitstream of the original video based on the extracted coding information.

9. The apparatus of claim 8, wherein the extracted coding information comprises at least one of block type information, motion vectors, a coded block pattern (CBP), and quantized transform coefficients.

10. The apparatus of claim 8, wherein the codec determination unit identifies the type of the used codec, and whether the type of the used codec supports enhancement layer coding.

11. The apparatus of claim 8, wherein the enhancement layer coding unit generates an enhancement layer bitstream by coding residual video between the original video and video reconstructed from the original video based on the extracted coding information.

12. The apparatus of claim 8, further comprising:
- a downscaling unit to downscale the received original video; and
- a base layer coding unit to generate the base layer bitstream by coding the downscaled video.

13. A scalable video decoding apparatus comprising:
- a bitstream separation unit to divide a received bitstream into a base layer bitstream and an enhancement layer bitstream;
- a codec determination unit to identify which codec is used for decoding the base layer bitstream;
- an information extraction unit to decode the base layer bitstream according to the result of the identifying in order to extract information for coding the base layer bitstream; and
- an enhancement layer decoding unit to decode the enhancement layer bitstream based on the extracted information.

14. The apparatus of claim 13, wherein the extracted information comprises at least one of block type information, motion vectors, a coded block pattern (CBP), and quantized transform coefficients.

15. A non-transitory computer readable recording medium having recorded thereon a computer program for executing a scalable video decoding method comprising:
- dividing a received bitstream into a base layer bitstream and an enhancement layer bitstream;
- identifying which codec is used for coding the base layer bitstream;
- decoding the base layer bitstream according to the result of the identifying in order to extract information for coding the base layer bitstream; and
- decoding the enhancement layer bitstream based on the extracted information.

\* \* \* \* \*